Oct. 19, 1937.   K. MARTIN   2,096,524
MAGNIFYING LENS
Filed Oct. 8, 1935

INVENTOR:
Karl Martin

Patented Oct. 19, 1937

2,096,524

UNITED STATES PATENT OFFICE 2,096,524

MAGNIFYING LENS

Karl Martin, Rathenow, Germany, assignor to firm Emil Busch Aktiengesellschaft, Optische Industrie, Rathenow, Germany Application October 8, 1935, Serial No. 44,079
In Germany October 11, 1934

1 Claim. (Cl. 88—39)

My invention relates to improvements in magnifying glasses of a type which consist of a glass having a curved upper surface and resting with its bottom face on the object under observation, so as to be in direct contact therewith; and which accordingly are hereinafter briefly called "direct contact" magnifiers in contradistinction to the usual reading glasses or lenses not in direct contact with the object but manually held or otherwise supported at a distance therefrom.

The problems underlying this invention and the advantages obtained will be better understood by first reviewing the drawbacks characteristic of direct contact magnifiers of known design.

The magnifying power of a direct contact magnifier largely depends on its total height, namely the distance of its upper curved face from the object under observation. For practical reasons however the total height of direct contact magnifiers is limited. Whenever direct contact magnifiers are given an abnormal height, so as to produce a larger magnification, their handiness and usefulness is impaired by their greater bulkiness and weight and by the more serious fact that the magnified image shows considerable distortions especially in the peripheral zones, as becomes evident for instance on magnifying squarely ruled paper, of which the straight lines appear inwardly bent and produce a cushion shaped figure. Another drawback inherent to direct contact magnifiers of known design, whereby their usefulness and applicability are greatly restricted, is the relatively small size of their field of vision.

The problem underlying this invention is to overcome the said drawbacks and to provide an improved direct contact magnifier, so redesigned, that a larger magnification of the object under observation than heretofore has been available is produced without any distorting effects in the peripheral zones; and that the actual field of view visible through the improved magnifier without distortion is substantially enlarged.

The nature and scope of the invention are briefly outlined in the appended claim and will be more fully understood from the following specification taken together with the accompanying drawing, in which:

Figure 1:
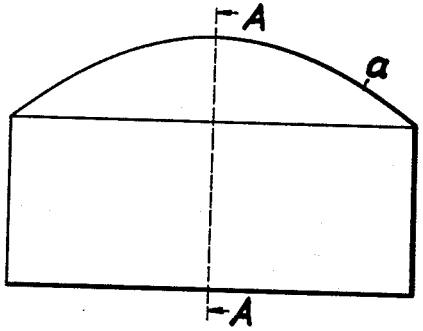
Fig. 1 is a side elevation showing in an enlarged scale a direct contact magnifier according to this invention.
Figure 2:
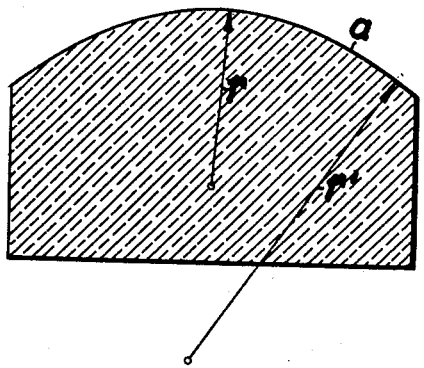
Fig. 2 is a cross-section vertically taken therethrough, namely along the central axis A—A of symmetry.

I have determined that the problem of substantially enlarging the rate of magnification without distorting the image and concurrently enlarging the field of view can be solved in a very simple way, namely by aspherically shaping the upper face of a direct contact magnifier in such manner that the generatrices, radii, of curvature grow larger towards the periphery of the magnifier's upper face.

Good results have been obtained by forming a direct contact magnifier, 52 mm. in diameter, with an aspherical upper face, so proportioned as to the respective generatrices $r$, $r_1$ of curvature, that the object under observation was magnified 2½ times and the field of view free from distortion was 25 mm. in diameter.

Various changes may be made in proportioning the upper aspherical face of direct contact magnifiers of the improved design described with regard to the refracting coefficient of the glass of which they consist, to their individual magnifying power in relation to the size of the undistorted image required, and to the purpose, for which they are made—for instance reading as against thread counting—without substantially departing from the spirit and the salient ideas of this invention.

What I claim is:

A magnifying lens consisting of a cylindrical main part, a bottom surface by which the lens is placed upon the object under observation and an upper aspherical surface curved in such a way that the length of the radii of the curvature increases from the centre of this surface towards the margin of the lens.

KARL MARTIN.